United States Patent
Nakagawa et al.

(10) Patent No.: US 6,654,676 B2
(45) Date of Patent: Nov. 25, 2003

(54) STEERING SYSTEM FOR TRACKLAYING VEHICLE

(75) Inventors: Tomohiro Nakagawa, Osaka (JP); Shigeru Yamamoto, Osaka (JP); Kazuyuki Suzuki, Osaka (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 10/103,115

(22) Filed: Mar. 22, 2002

(65) Prior Publication Data

US 2002/0193927 A1 Dec. 19, 2002

(30) Foreign Application Priority Data

Mar. 29, 2001 (JP) .................................... P2001-096574

(51) Int. Cl.[7] .............................................. G06F 19/00
(52) U.S. Cl. ............................... 701/50; 180/6.2; 477/1; 475/19; 475/27
(58) Field of Search ............................... 701/50, 51, 53, 701/66, 72; 180/6.2; 475/19, 27; 477/1, 35

(56) References Cited

U.S. PATENT DOCUMENTS

| | | | |
|---|---|---|---|
| 4,043,227 A | 8/1977 | Beals et al. | |
| 4,068,543 A | 1/1978 | Sakai et al. | |
| 4,699,239 A | 10/1987 | Ishino et al. | |
| 4,949,823 A | * 8/1990 | Coutant et al. | ............. 192/221 |
| 5,285,861 A | 2/1994 | Nakamura | |
| 5,473,541 A | 12/1995 | Ishino et al. | |
| 5,477,454 A | 12/1995 | Ishino et al. | |
| 5,477,455 A | 12/1995 | Ishino et al. | |
| 5,535,840 A | 7/1996 | Ishino et al. | |
| 5,569,109 A | * 10/1996 | Okada | ........................ 475/28 |
| 5,611,405 A | 3/1997 | Ishino et al. | |
| RE36,151 E | 3/1999 | Ishino et al. | |
| 6,474,426 B2 | * 11/2002 | Yamamoto et al. | ........ 180/9.44 |
| 6,564,481 B2 | * 5/2003 | Wakitani et al. | |
| 2002/0020579 A1 | 2/2002 | Yamamoto et al. | |

FOREIGN PATENT DOCUMENTS

JP 63-235173 9/1988

* cited by examiner

Primary Examiner—William A. Cuchlinski, Jr.
Assistant Examiner—Olga Hemandez
(74) Attorney, Agent, or Firm—Rader, Fishman & Grauer PLLC

(57) ABSTRACT

An object is to provide a steering system for a tracklaying vehicle which is capable of preventing overrun of a motor during a pivot turn irrespective of the load of the road surface and does not cause a shortage of power during a turn. The steering system is comprised of a pair of brakes for right and left output shafts and designed to transmit the driving force of a hydraulic motor to the output shafts through a planetary gear mechanism. A transmission of a driving force from the hydraulic motor to the planetary gear mechanism is interrupted after concurrently carrying out actuation of a brake for either one of the right and left output shafts and a transmission of a driving force from the hydraulic motor to the planetary gear mechanism for a specified period of time, when the vehicle carries out a pivot turn. During a pivot turn of the vehicle, the engine is controlled such that a vehicle body speed obtained by a bevel shaft rotational speed detector becomes equal to a specified value.

6 Claims, 9 Drawing Sheets

(a)

(b)

(a)

(b)

STEERING SYSTEM FOR TRACKLAYING VEHICLE

TECHNICAL FIELD

The present invention relates to a steering system for a tracklaying vehicle, which includes a pair of brakes provided for right and left output shafts and is designed to transmit the driving force of a hydraulic motor to the respective output shafts through a differential steering means.

BACKGROUND ART

In a known steering system for a tracklaying vehicle such as a bulldozer, the hydraulic motor is driven by a hydraulic pump actuated by the engine and the output of the hydraulic motor is transmitted to the right and left output shafts through a differential steering means such as a planetary gear mechanism, thereby making the rotational speeds of the right and left sprockets different from each other to turn the vehicle.

Such a steering system for a tracklaying vehicle suffers from the problem that since the hydraulic motor receives a reaction force caused by the turning resistance of the vehicle when the vehicle turns and the reaction force acting on the hydraulic motor increases as the radius of turn of the vehicle becomes small, a radius of turn exceeding the capacity of the hydraulic pump and the hydraulic motor cannot be obtained. In addition, the steering system employing the hydraulic motor also presents such a problem that all the power required for turns is obtained from oil pressure and therefore allowance has to be made for engine power.

An attempt to solve the above problems has been made in Japanese Patent Application No. 63-235173 (1988). This publication teaches a system in which the closed circuit for the hydraulic pump and the hydraulic motor is provided with right and left steering brake valves and a transverse shaft is provided with a pair of brakes. In this system, when the operating position of the steering lever becomes more than or equal to an intermediate operational amount, the output of the hydraulic motor is set to zero and either the right or left sprocket is braked, whereby the reaction force is prevented from working on the hydraulic motor when a turn with a small turning radius (e.g., pivot turn) is carried out.

The technique disclosed in the above publication, however, has revealed the following problem. Regarding the relationship between a timing for braking a sprocket by a brake and a timing for disconnecting the hydraulic motor from a driving power source, if the braking timing is slower than the disconnecting timing, the relative speed of the right and left sprockets is dependent only on the load of the road surface applied to the respective crawler belts, so that the radius of turn of the vehicle cannot be made to be constant. On the other hand, if the braking timing is quicker than the disconnecting timing, the vehicle gets a great shock at the instant the vehicle starts a pivot turn, in some cases depending on the relationship between the timings.

To solve such a problem, the present inventors have already suggested a steering method for a tracklaying vehicle in the previous invention (Japanese Patent Application No. 2000-83329). According to this method, when the vehicle makes a pivot turn, after actuation of the brake for either one of the right and left output shafts and a transmission of a driving force from the hydraulic motor to the differential steering means have been carried out concurrently for a specified period of time, the transmission of the driving force from the hydraulic motor to the differential steering means is interrupted. The previous invention also discloses a method for controlling the rotational speed of the engine so as to be less than or equal to a specified value during a pivot turn of the vehicle in order to prevent an unfavorable situation such as when either one of the drive shafts is stopped by actuation of its corresponding brake, the hydraulic motor receives a driving force from the other drive shaft being rotated and, in consequence, the rotation of the motor overruns.

However, in cases where the motor overrun prevention method disclosed in the previous invention is adopted, there arise other problems. Specifically, the rotational speed of the motor deviates from the desired value in some cases depending on the surface condition of the road on which the tracklaying vehicle is traveling, or the engine may be excessively throttled down, resulting in a shortage of power during a pivot turn.

The invention is directed to overcoming the foregoing problems and a primary object of the invention is therefore to provide a steering system for a tracklaying vehicle which is capable of preventing overrun of the motor during a pivot turn irrespective of the load of the road surface and does not cause a shortage of power during a turn.

DISCLOSURE OF THE INVENTION

The above object can be accomplished by a steering system for a tracklaying vehicle according to the invention wherein a pair of brakes are provided for right and left output shafts and the driving force of a hydraulic motor is transmitted to the right and left output shafts through differential steering means, the system comprising:

(a) brake actuating means for independently actuating the right and left brakes;

(b) driving force transmission interrupting means for interrupting a transmission of a driving force from the hydraulic motor to the differential steering means;

(c) pivot turn control instruction signal detecting means for detecting an issue of a vehicle pivot turn control instruction signal;

(d) vehicle speed detecting means for detecting the vehicle body speed of the vehicle;

(e) controlling means for controlling the brake actuating means and the driving force transmission interrupting means in response to an output from the pivot turn control instruction signal detecting means such that after actuation of a brake for either one of the right and left output shafts by the brake actuating means and a transmission of a driving force from the hydraulic motor to the differential steering means are carried out concurrently for a specified period of time, the driving force transmission interrupting means interrupts the transmission of the driving force from the hydraulic motor to the differential steering means, wherein the controlling means controls an engine such that the vehicle body speed of the vehicle detected by the vehicle speed detecting means during a pivot turn of the vehicle becomes equal to a specified value.

In the invention, during a pivot turn, actuation of a brake for either one of the right and left output shafts and a transmission of a driving force from the hydraulic motor to the differential steering means are concurrently carried out for a specified time and thereafter, the transmission of the driving force from the hydraulic motor to the differential steering means is interrupted thereby bringing the hydraulic motor into its free condition. Accordingly, trouble caused by an unfavorable situation such as when the timing for the brake actuation is delayed and the free condition of the hydraulic motor continues until the brake is actuated can be avoided. In other words, the problem of having the relative speed of the right and left sprockets be dependent upon only the load of the road surface exerted on the respective crawler belts can be avoided. In addition, that the present invention prevents the vehicle from getting a great shock at the instant of a pivot turn. Further, during a pivot turn, the transmission of a driving force from the hydraulic motor to the differential steering means is interrupted so that a reaction force from the road surface does not act on the hydraulic motor, and therefore, it is possible to make a pivot turn with a conventional hydraulic motor of a small capacity. Since the controlling means of the invention controls the engine such that the vehicle body speed of the vehicle detected by the vehicle speed detecting means during a pivot turn of the vehicle becomes equal to a specified value, the present invention also avoids the possibility that while one of the drive shafts is stopped by actuation of its corresponding brake, the hydraulic motor receives a driving force from the rotating one of the drive shafts, resulting in overrun of the rotation of the motor. Additionally, since the engine is controlled based on a detection signal indicating the vehicle body speed of the vehicle, the engine control can be carried out irrespective of the load of the road surface in any conditions so that a shortage of power can be reliably prevented during a turn.

Preferably, in the invention, the vehicle body speed is detected by detecting the rotational speed of the output side of the transmission, and according to the detected vehicle body speed, the controlling means controls an engine rotation instruction value. It should be noted that the vehicle body speed may be detected by the output shaft of the transmission, a bevel shaft, or a transverse shaft as far as these shafts are on the output side of the transmission.

In this case, the controlling means preferably executes the engine control based on a map showing the relationship between vehicle body speed and engine rotation instruction values. The map is comprised of a first map for determining an engine rotation instruction value corresponding to a detected vehicle body speed and a second map for compensating for the deviation of the engine rotation instruction value determined by the first map from a target vehicle body speed. With this arrangement, after a value approximate to an engine rotation instruction value corresponding to a target vehicle body speed has been obtained by use of the first map, the deviation of the current vehicle body speed from the target vehicle body speed can be compensated for, so that not only the hunching phenomenon but also excessive throttling of the rotational speed of the engine can be prevented, thereby converging the vehicle body speed on the desired value within a short time.

Preferably, the system of the invention includes tractive force detecting means for detecting the tractive force of the vehicle such that when the tractive force detected by the tractive force detecting means becomes more than or equal to a specified value during a pivot turn of the vehicle, the controlling means shifts the transmission to a lower speed range. With this arrangement, where a great tractive force is needed because of turning resistance when the transmission is placed in a high speed range, higher turning efficiency can be achieved by obtaining a greater tractive force through shifting of the transmission into a lower speed range.

In this case, when shifting the transmission to a lower speed range, it is preferable to carry out gear shift with one selected from a plurality of speed range characteristic lines each representing a tractive force characteristic versus vehicle body speed, the selected speed range characteristic line providing a greater tractive force value for the same vehicle body speed than others. This enables turning operation with the highest efficiency.

BEST MODE FOR CARRYING OUT THE INVENTION

Referring now to the accompanying drawings, a steering system for a tracklaying vehicle will be described according to a preferred embodiment of the invention.

Figure 1:
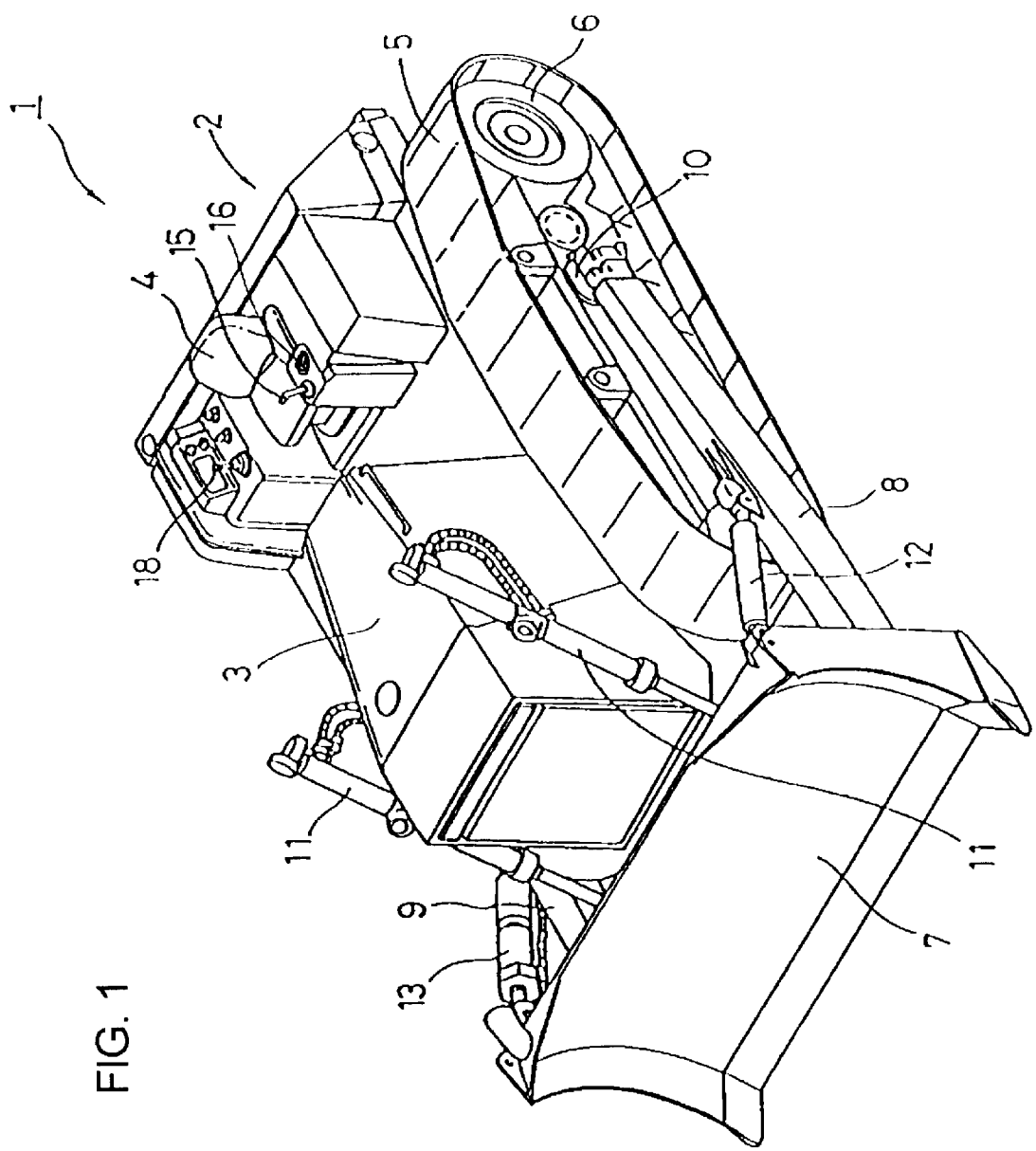
FIG. 1 shows an external appearance of a bulldozer constructed according to one embodiment of the invention.

This embodiment is associated with one application of the invention to a steering system for a bulldozer. FIG. 1 shows an external appearance of a bulldozer constructed according to one embodiment of the invention.

In the bulldozer 1 of the present embodiment, there are provided a bonnet 3 and a cab 4 on a vehicle body 2. Disposed on both right and left sides of the vehicle body 2 when viewed in the forward driving direction of the vehicle body 2 are crawler belts 5 for driving the vehicle body 2 so as to travel forwardly and reversely and turn. The crawler belts 5 are respectively independently driven by a driving force transmitted from an engine 20 (see FIG. 2) with the aid of their associated sprockets 6.

A blade 7 is supported at the distal ends of right and left straight frames 8, 9 the proximal ends of which are, in turn, pivotally supported at the right and left sides of the vehicle body 2 through trunnions 10 (the trunnion on the right side is not shown in the drawing) such that the blade 7 can be raised or lowered. A right and left pair of blade lift cylinders 11 are arranged between the blade 7 and the vehicle body 2, for raising or lowering the blade 7. A brace 12 and a blade tilt cylinder 13 are provided for laterally tilting the blade 7, the former being positioned between the left straight frame 8 and the blade 7 and the latter being positioned between the right straight frame 9 and the blade 7.

Positioned on the left side of the cab 4 are (a) a traveling lever 15 (which corresponds to the turning operation lever of the invention) for selection of the forward or backward drive, steering, and gear shift operation and (b) a fuel control dial 16. On the right side of the cab 4, there is provided a blade control lever 18 or the like for raising, lowering, left-tilting and right-tilting the blade 7. Although not shown in the drawing, there is provided a decelerator pedal in front of the cab 4.

Figure 2:
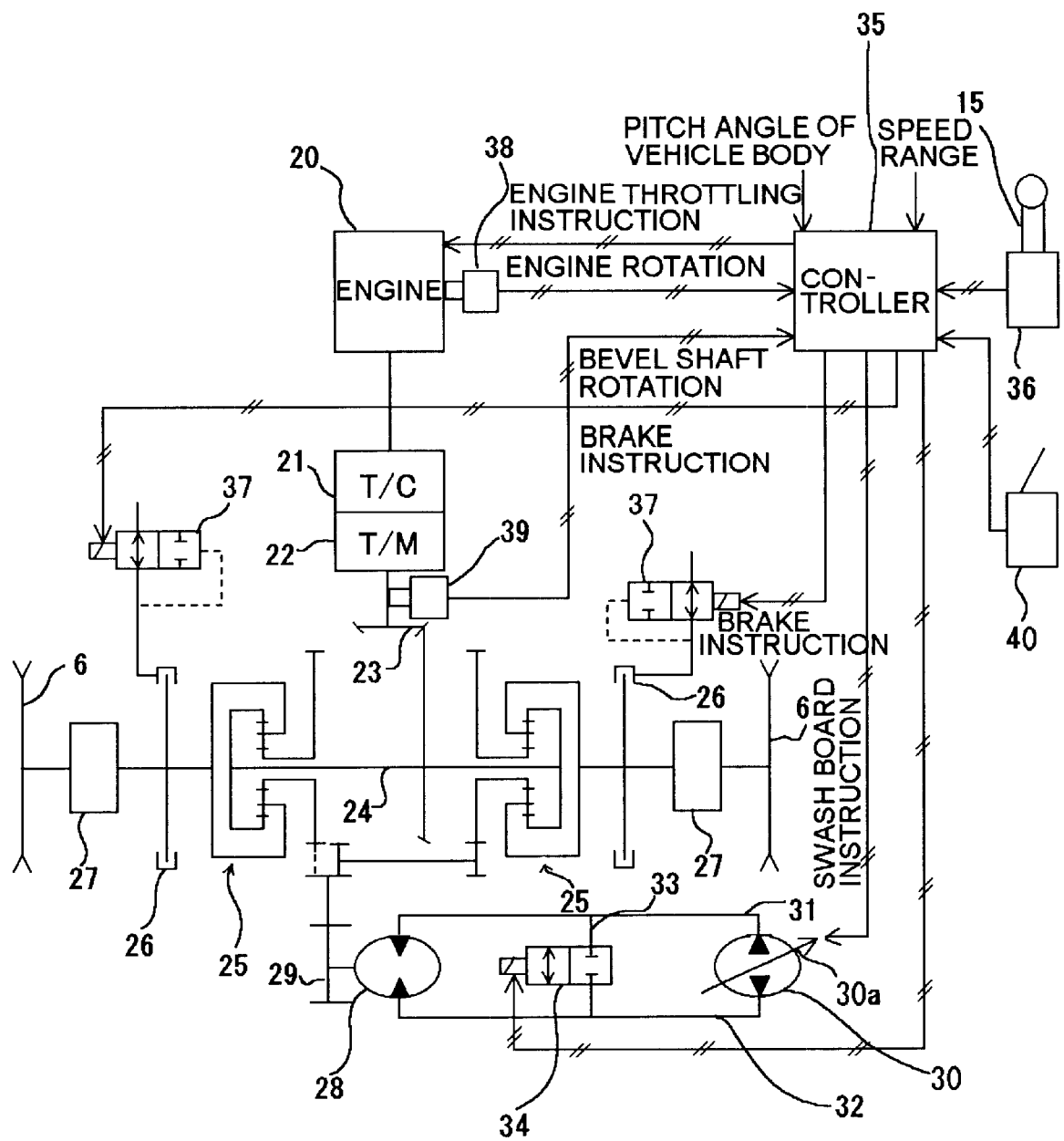
FIG. 2 is a structural diagram of a control system according to the embodiment.

Referring to FIG. 2 which shows a power transmission system and a control system configuration according to the present embodiment, the rotary driving force of the engine 20 is transmitted to a torque converter 21 equipped with a lock-up mechanism through a damper and a PTO (these are not shown in the drawing). Thereafter, the rotary driving force is transmitted from the output shaft of the torque converter 21 to a transmission 22 and then transmitted from the output shaft of the transmission 22 to a transverse shaft 24 through a bevel gear 23. Coupled to the transverse shaft 24 are right and left planetary gear mechanisms 25 (which correspond to the differential steering means of the invention). The output shafts of the planetary gear mechanisms 25 are respectively coupled to their associated sprockets 6 through brake units 26 and final reduction gears 27.

The planetary gear mechanisms 25 are coupled to and driven by a pinion 29 which is mounted on the output shaft of a fixed displacement hydraulic motor (HSS motor) 28 for steering. A variable displacement hydraulic pump (HSS pump) 30 is coupled to the output side of the torque converter 21. Discharged oil from the hydraulic pump 30 is introduced into the hydraulic motor 28 through a pipe line 31 or 32. A steering system hydraulic circuit including these hydraulic pump 30 and hydraulic motor 28 is an independent closed circuit. The hydraulic motor 28 is forwardly rotated by pressure oil discharged from one side of the hydraulic pump 30 and reversely rotated by pressure oil discharged from the other side. The pipe lines 31, 32 are connected through a communication path 33 so as to be communicated with each other. Interposed in the midway of the communication path 33 is a communication valve (unloading valve) 34. The communication valve 34 shuts down the communication path 33 when a solenoid is deenergized. When the solenoid is energized by a solenoid actuation instruction signal from a controller 35, the communication valve 34 is controlled to open the communication path 33.

In this way, the discharged oil of the hydraulic pump 30 is supplied to the hydraulic motor 28 and the rotational speeds of the right and left sprockets 6 are made to be different from each other by the right and left planetary gear mechanisms 25 coupled to the output shaft of the hydraulic motor 28, whereby the running speeds of the right and left crawler belts 5 are adjusted so as to turn the vehicle body 2 to the right or left. By changing the angle of a swash plate 30a for the hydraulic pump 30 thereby to change the amount of discharged oil, the rotational speed of the hydraulic motor 28 is increased or decreased to control the radius of turn of the vehicle body 2. By changing the orientation of the swash plate 30a thereby to change the flowing direction of the discharge oil, the turning direction of the vehicle body 2 is altered.

When the traveling lever 15 is manually operated, the output voltage (lever stroke voltage) corresponding to the position of the lever 15 is output from a potentiometer 36 and its signal is input to the controller 35. An output signal from the controller 35 is input to a servo electromagnetic valve (not shown). According to switching of the servo electromagnetic valve, the piston position of a servo pump (not shown) is controlled and according to this piston position, the angle of the swash plate 30a of the hydraulic pump 30 is adjusted.

The brake units 26 interposed between their associated planetary gear mechanisms 25 and final reduction gears 27 are in their unactuated condition, being fed with oil pressure, when the solenoids for the brake valves (brake actuating means) 37 are energized. When the solenoids are deenergized by a brake instruction signal from the controller 35, the brake units 26 are controlled by spring force so as to be brought into their actuated condition.

The controller 35 issues an engine throttling instruction signal (engine rotation instruction signal) to the engine 20 in order to reduce the rotational speed of the engine 20, in addition to a swash plate instruction signal to the swash plate 30a of the hydraulic pump 30; a solenoid actuation instruction signal to the communication valve 34; and a brake instruction signal to the brake valves 37. To enable these control operations, the controller 35 inputs, in addition to a lever stroke voltage signal from the traveling lever 15, an engine rotational speed signal from an engine rotational speed detector 38 attached to the engine 20; a bevel shaft rotational speed signal from a bevel shaft rotational speed detector 39 attached to a bevel shaft on the output side of the transmission 22; a vehicle body pitch angle signal from a vehicle body pitch angle sensor for detecting the inclination angle of the vehicle body when inclining forwardly or backwardly; a speed range signal indicating the speed range of the transmission 22; and others.

Figure 3:
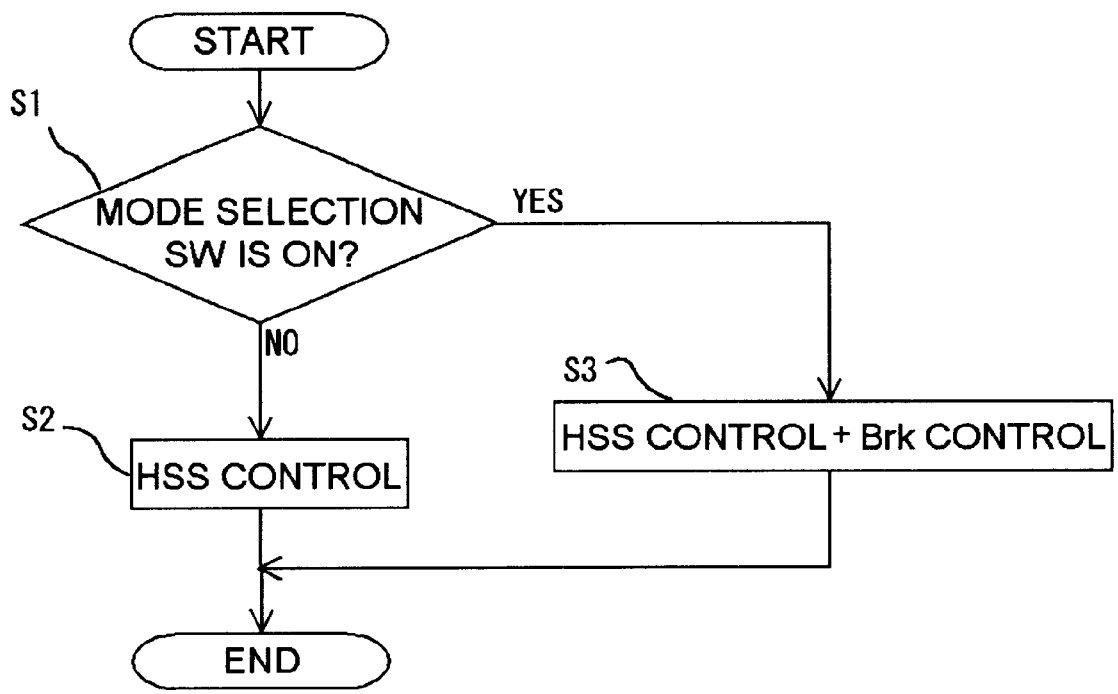
FIG. 3 is a flow chart of mode section control.

At a specified position in the neighborhood of the cab 4, an On/Off-type mode selection switch 40 is provided, with which the operator selects whether or not vehicle pivot turn control (described later) will be executed. As shown in the flow chart of FIG. 3, in the controller 35, it is determined whether the mode selection switch 40 has been turned ON (Step S1) and if the mode selection switch 40 has been turned OFF, the so-called power turn is executed (Step S2) by steering control (hereinafter referred to as "HSS control") with the ordinary hydraulic motor 28 even when the lever stroke of the traveling lever 15 is in a preset pivot turn region (which is the stroke end in the present embodiment). On the other hand, if the mode selection switch 40 has been turned ON, when the lever stroke of the traveling lever 15 has entered the preset pivot turn region, the pivot turn control (HSS control+brake control) described later is executed according to the present embodiment (Step S3).

Figure 4:
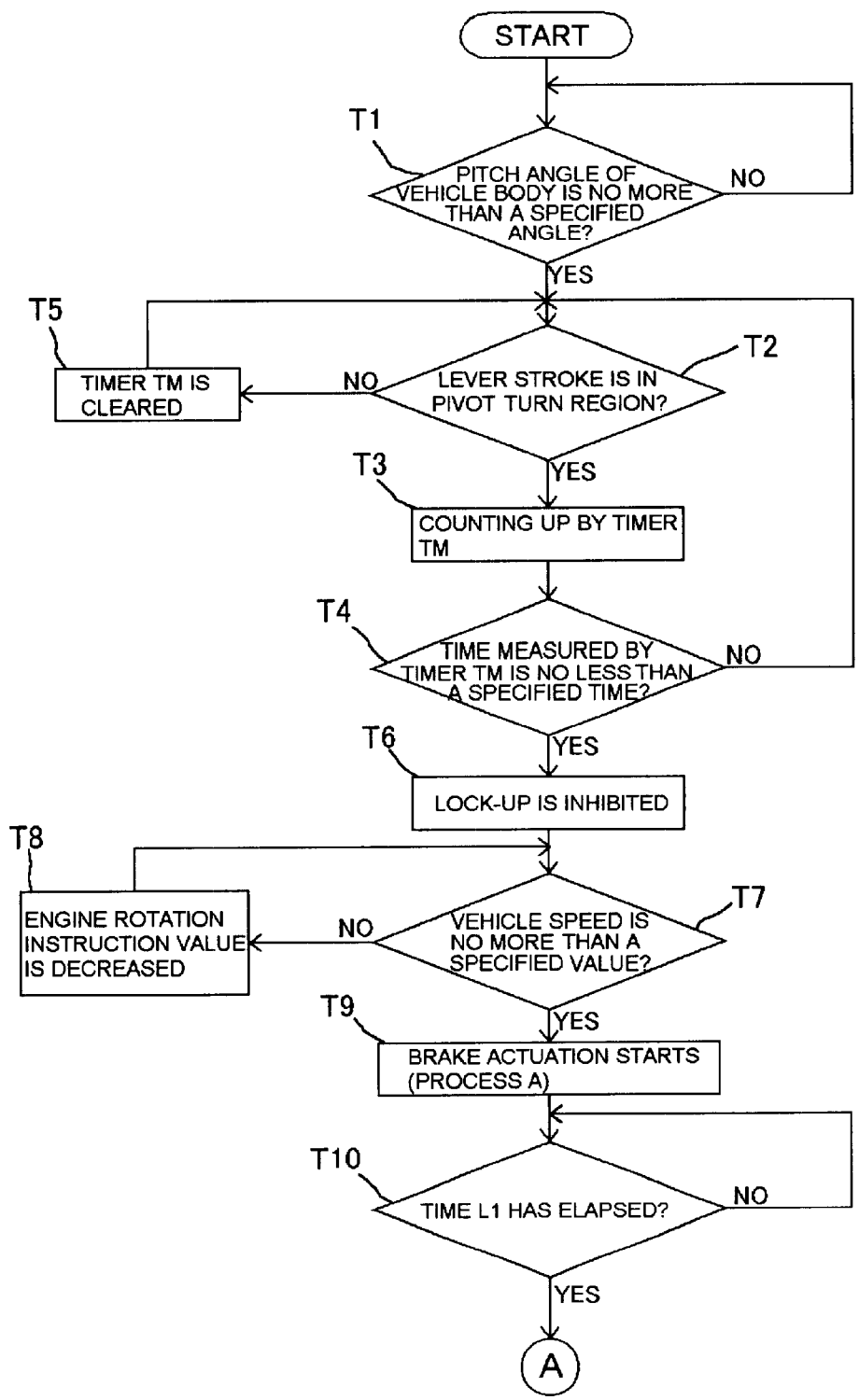
FIG. 4 is a flow chart of the first half of pivot turn control according to the present embodiment.
Figure 5:
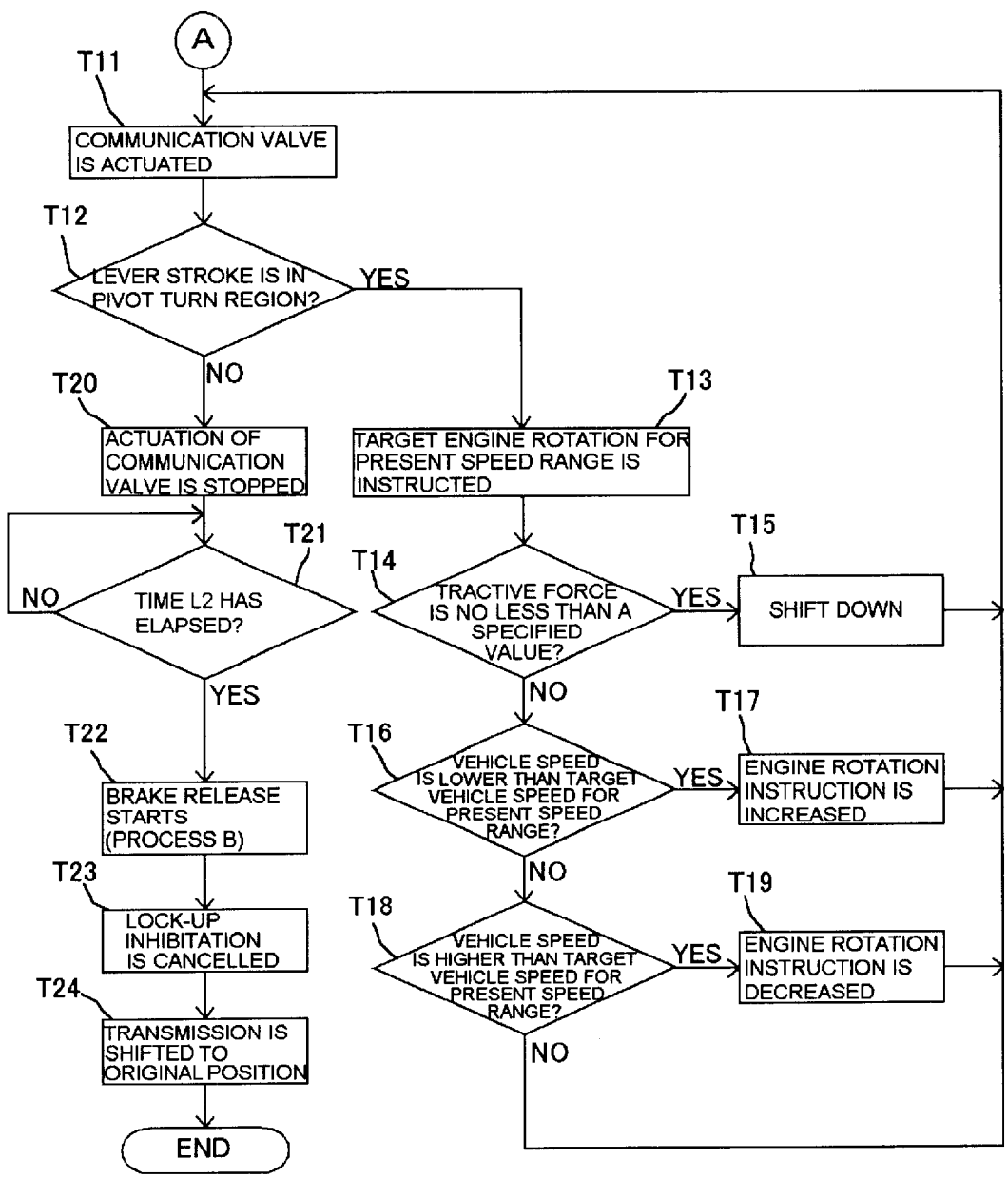
FIG. 5 is a flow chart of the second half of the pivot turn control according to the present embodiment.

Next, the pivot turn control (brake control) according to the present embodiment will be described with reference to the flow charts of FIGS. 4 and 5.

Step T1: Based on a vehicle body pitch angle signal from the vehicle body pitch angle sensor, a check is made to determine if the pitch angle of the vehicle body is less than or equal to a specified value (e.g., 9 degrees). If the pitch angle exceeds the specified value, it is then determined that the vehicle is in a descending travel state, with its speed being increased, so that the pivot turn control comprised of the following steps will not be performed. Only when the pitch angle is less than or equal to the specified value, the program proceeds to the next step T2.

Figure 6:
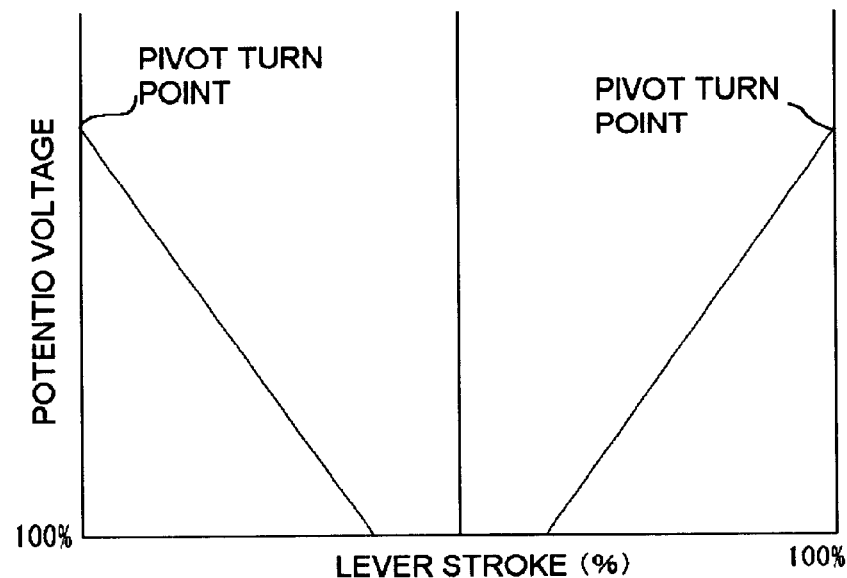
FIGS. 6(a) and 6(b) show a pivot turn region and a characteristic graph of the pivot turn control, respectively.
Figure 6:
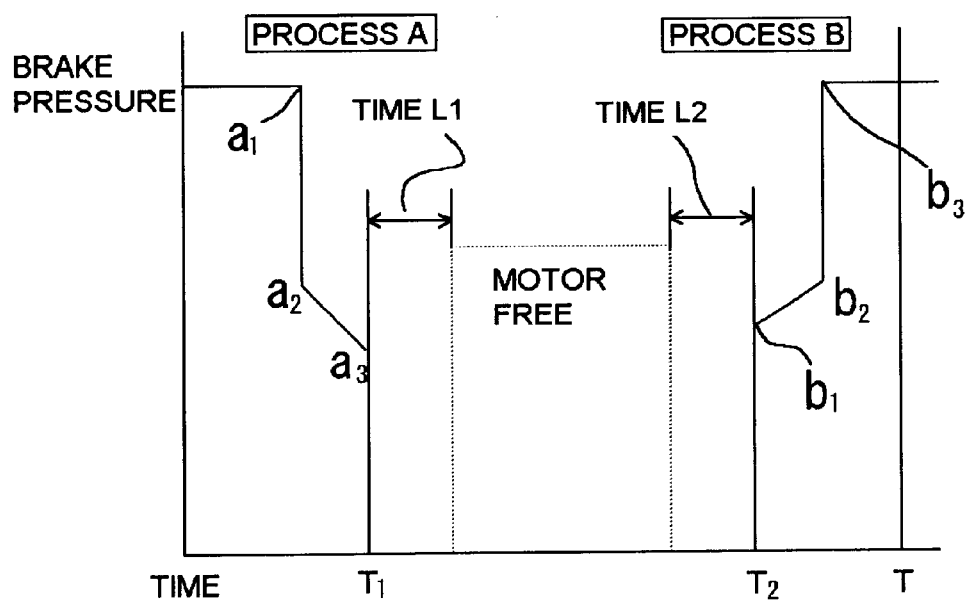

Step T2: A check is made to determine if the lever stroke of the traveling lever 15 is in the pivot turn region. It should be noted that, in the present embodiment, the pivot turn region (pivot point) is defined as the point at which the lever stroke is 100% as shown in FIG. 6(a), that is, the traveling lever 15 has been pressed down to the stroke end.

Steps T3 to T4: If the lever stroke is in the pivot turn region, counting-up is started with a timer TM for measuring a time during which the traveling lever 15 is being kept in the pivot turn region. Then, it is determined whether the time measured by the timer TM is more than or equal to a specified value (which is about 1 to 3 seconds in the present invention). The measurement by the timer TM is made for the following reason: If the operator presses the traveling lever 15 down to the stroke end and keeps it in this position, this operator's action is interpreted as meaning that he wants to make the radius of turn of the vehicle smaller and it is therefore judged to be appropriate to execute the following pivot turn control.

Step T5: If the lever stroke is not in the pivot turn region, the timer TM is cleared and the judgement of Step T2 is done again.

Step T6: If the lock-up mechanism for the torque converter 21 is in its ON state, a power shortage would occur during a pivot turn. Therefore, turning-ON of the lock-up mechanism is inhibited during the pivot turn control.

Figure 7:
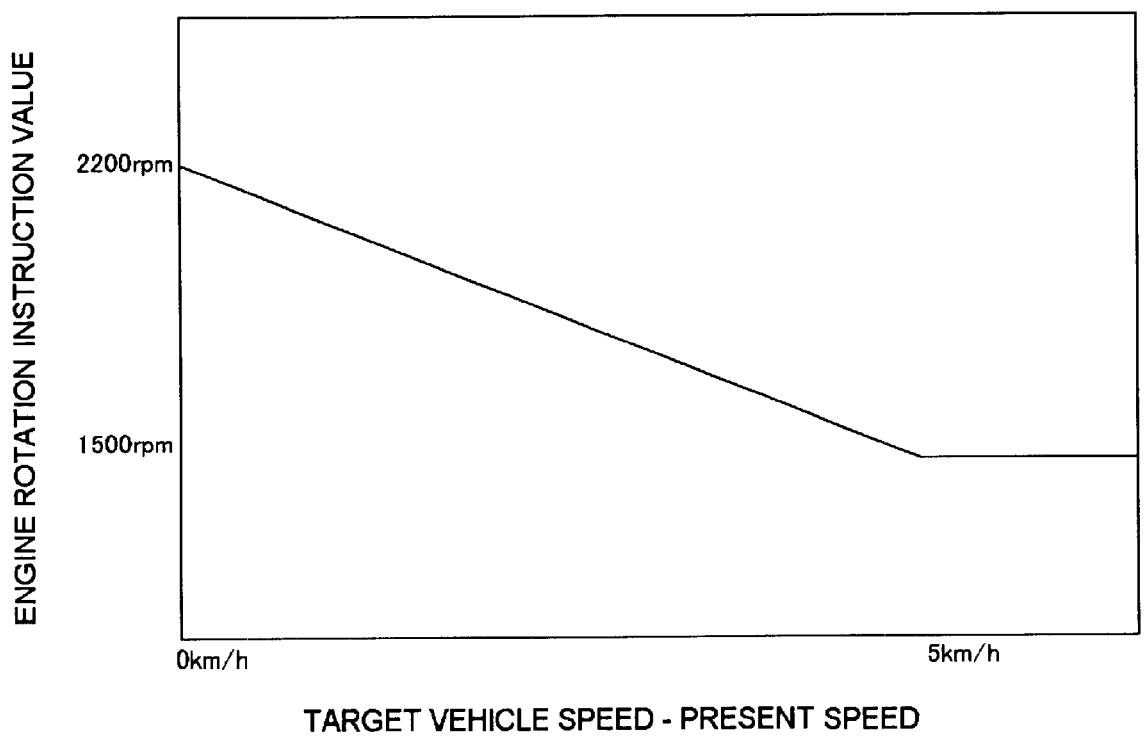
FIG. 7 is a map used for obtaining an engine rotation instruction value prior to actuation of a brake.

Steps T7 to T8: Before brake actuation, a check is made to determine if a vehicle body speed (vehicle speed) obtained from the rotational speed of the bevel shaft detected by the bevel shaft rotational speed detector 39 is lower than or equal to a preset vehicle speed. If it is not lower than or equal to the preset vehicle speed, an engine throttling instruction is issued to the engine 20 to reduce the rotational speed of the engine 20. This control is performed so that the rotational speed of the hydraulic motor 28 should not exceed an allowable motor rotational speed during execution of the pivot turn control. FIG. 7 shows one example of the map used for obtaining an engine rotation instruction value at that time. With this map, an engine rotation instruction value in compliance with the difference between a target vehicle speed and a present vehicle speed can be obtained. The map of this type is prepared for each of the speed ranges (F1, F2, R1 and R2) of the transmission 22 and the map shown in FIG. 7 is associated with the forward first speed (F1).

Step T9: When the vehicle speed becomes lower than or equal to the specified vehicle speed, a brake instruction signal is released to one of the brake valves 37, thereby starting actuation of its associated brake unit 26. The control pattern for the brake unit 26 at that time is as follows: As represented by Process A of FIG. 6(*b*), pressure oil is allowed to flow back, starting from a brake release state (point $a_1$) to reduce brake pressure to point $a_2$. Then, the braking force is gradually increased from point $a_2$ to point $a_3$. At the time $T_1$, the brake is coupled at point $a_3$. After the brake coupling, the brake pressure is reduced to zero.

Steps T10 to T11: A check is made to determine if a specified time L1 has elapsed after completion of the actuation of the brake unit 26, thereby judging if the brake actuation pressure has become lower than or equal to a specified value. If the specified time L1 has elapsed, an actuation instruction signal is released to the solenoid for the communication valve 34 to open the communication path 33. This allows the output of the hydraulic motor 28 to become zero with the hydraulic motor 28 being in its free condition, after the specified time L1 has elapsed after actuation of the right or left brake unit 26. In other words, after the actuation of the brake unit 26 and a transmission of a driving force from the hydraulic motor 28 to the sprocket 6 have been concurrently carried out, the hydraulic motor 28 is brought into its free condition. Therefore, various problems can be avoided such as when a timing for actuating the brake unit 26 is delayed and the free condition of the hydraulic motor 28 continues until actuation of the brake unit 26, the relative speed of the right and left sprockets is dependent upon only the load of the road surface exerted on the respective crawler belts. In addition, a great shock can be prevented from occurring to the vehicle body at the instant a pivot turn starts, and a pivot turn can be smoothly carried out without permitting the turn reaction force received from the road surface to act on the hydraulic motor 28. The specified time L1 mentioned herein is preferably, experimentally set to about 0.2 to 0.5 second, because the shock at the instant a pivot turn starts is at its minimum value with this range.

Figure 8:
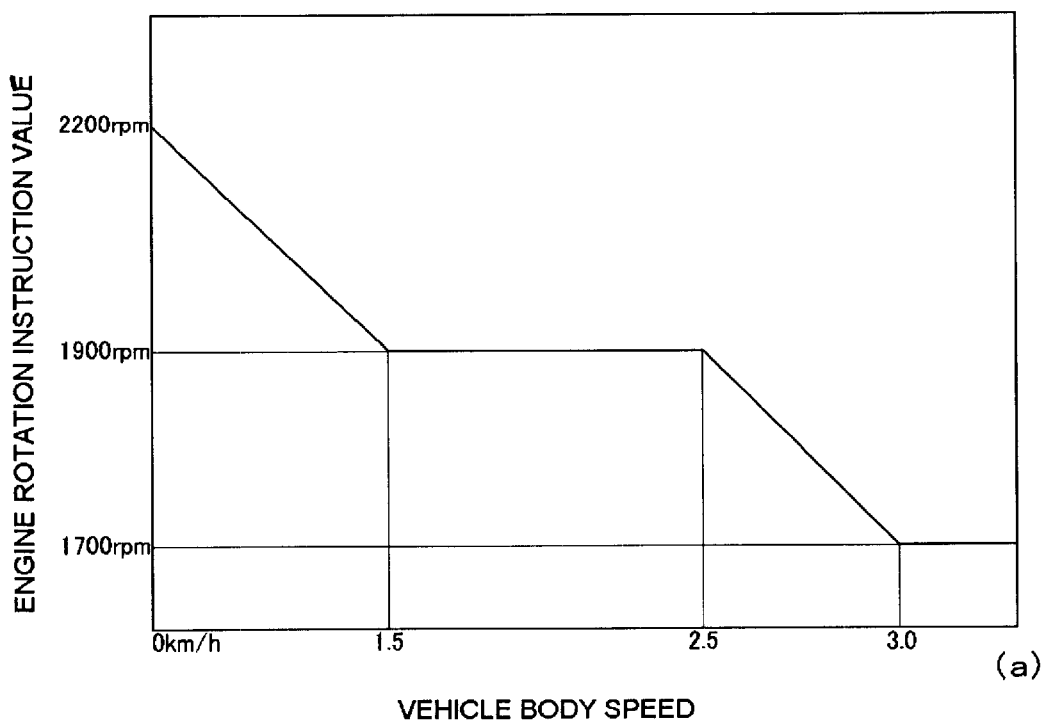
FIGS. 8(a) and 8(b) are a first map used for obtaining an engine rotation instruction value during brake actuation and a second map (compensation map) used for obtaining an engine rotation instruction value during brake actuation, respectively.
Figure 8:
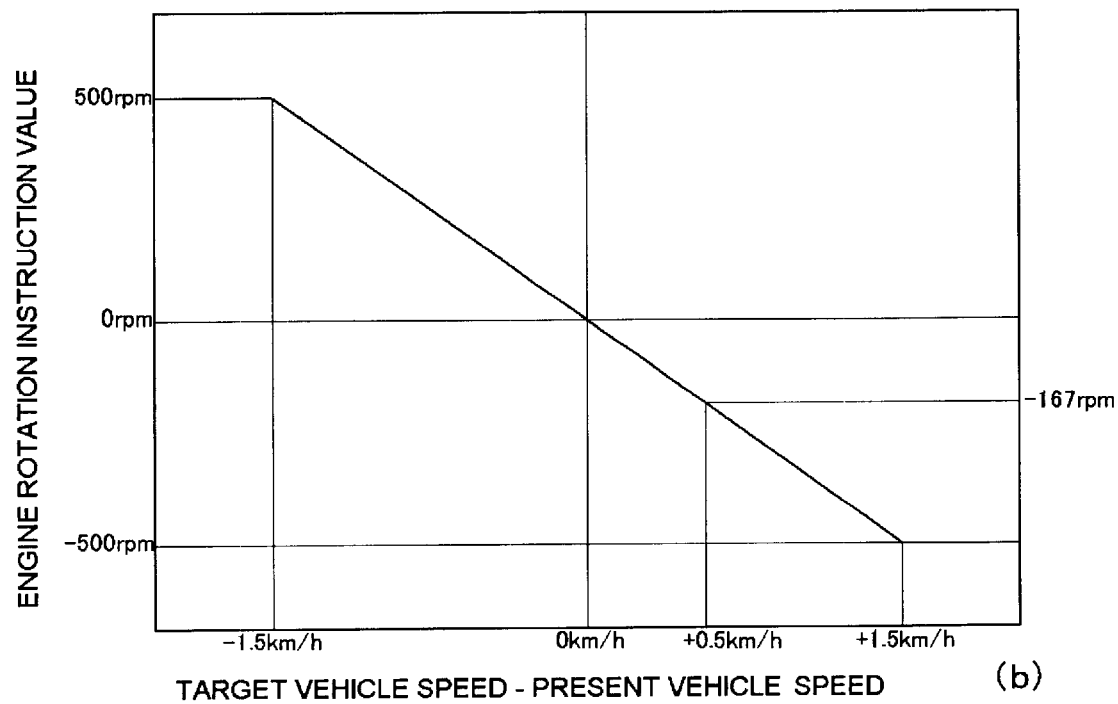

Steps T12 to T13: A check is made again to determine if the lever stroke is in the pivot turn region. If so, the target engine rotational speed for the presently selected speed range is instructed at a first stage. Note that a target engine rotational speed is set for every present speed range (F1, F2, R1, R2). FIG. 8(*a*) shows one example (an example of the speed range F1) of the first map used for obtaining an engine rotation instruction value required herein. With this map, the engine rotation instruction value in compliance with the present vehicle body speed (vehicle speed) can be attained. For instance, when the vehicle body speed is less than 1.5 km/h, a value within the range of from 1,900 rpm to 2,200 rpm is selected as an engine rotation instruction value, so that the vehicle body speed converges on a value within the range of from 1.5 km/h to 2.5 km/h (engine rotational speed=1,900 rpm). On the contrary, when the vehicle body speed is 2.5 km/h to 3.0 km/h, a value within the range of from 1,700 rpm to 1,900 rpm is selected as an engine rotation instruction value, whereby the vehicle body speed converges on a value within the range of from 1.5 km/h to 2.5 km/h (engine rotational speed=1,900 rpm).

Steps T14 to T15: A tractive force for the vehicle body is calculated based on an engine rotation signal from the engine rotational speed detector 38 and a bevel shaft rotational speed signal from the bevel shaft rotational speed detector 39. Then, it is determined if the calculated tractive force is more than or equal to a specified value. If the tractive force is more than or equal to the specified value, it is then judged that road surface resistance is presently increasing. Since a turn can be more effectively made with a lower speed range, the transmission 22 is automatically shifted down to a lower speed range (e.g., the transmission 22 is shifted from the forward second speed (F2) to the forward first speed (F1)).

Figure 9:
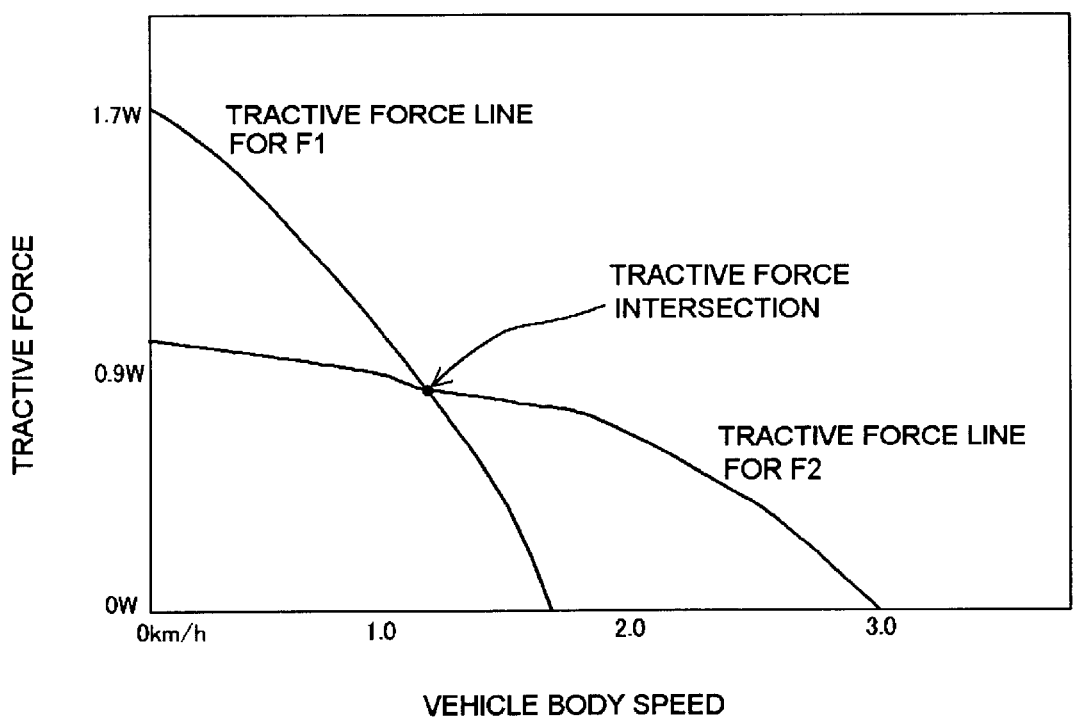
FIG. 9 is a map showing one example of a shift down done by a tractive force.

In this case, when shifting the transmission 22 to a lower speed range, it is preferable to select one of the speed range characteristic lines such as shown in FIG. 9, each of which represents a tractive force characteristic versus vehicle body speed, the selected speed range characteristic line providing a greater tractive force value for the same vehicle body speed than others.

In the example shown in FIG. 9, control is first performed according to the tractive force characteristic line for the forward second speed (F2), and when the detected tractive force has increased to a value exceeding the tractive force intersection, shift down is done with the tractive force intersection serving as a threshold, so that control is now performed with the tractive force characteristic line for the forward first speed (F1). This enables the most efficient (the fastest) turning action.

Steps T16 to T19: To compensate for the deviation of the engine rotation instruction value which has been set in the previous step T13 from a target vehicle body speed thereby to determine an engine rotation instruction value for the second stage, a check is made to determine if the vehicle speed obtained from the rotational speed of the bevel shaft detected by the bevel shaft rotational speed detector 39 is lower than the target vehicle speed for the presently selected speed range. If so, control is performed so as to increase the engine rotation instruction. It should be noted that this engine rotation instruction value is increased within the range which does not exceed instruction values for the engine fuel dial and the decelerator pedal. Then, a check is made to determine if the vehicle speed is higher than the target vehicle speed set for the present speed range. If so, control is performed so as to reduce the engine rotation instruction. FIG. 8(b) shows one example of the second map (an example of the speed range F1) used for obtaining the engine rotation instruction value at that time. According to this map, where the target vehicle body speed is 2 km/h while the actual vehicle body speed is 2.5 km/h for example, the engine rotational speed is set to a value which is lower than the engine rotation instruction value set with the first map (see FIG. 8(a)) by 167 rpm. With such compensation, the vehicle body speed can be maintained at 2 km/h, with the engine rotational speed being around 1,900 rpm.

Step T20: When the lever stroke is out of the pivot turn region, the actuation of the communication valve 34 is stopped. This allows the hydraulic motor 28 to be released from its free condition.

Steps T21 to T22: A check is made to determine if a specified time L2 has elapsed after the stop of the actuation of the communication valve 34, thereby judging if the brake actuation pressure is higher than or equal to a specified value. If the specified time L2 has elapsed, a release of the brake unit 26 is started. The releasing pattern for the brake unit 26 used at that time is such that, as represented by Process B of FIG. 6(b), a supply of pressure oil is started at the time $T_2$ from the state where the brake pressure is zero, so that the brake pressure reaches point $b_1$. The braking force is gradually reduced from point $b_1$ to point $b_2$ so that the brake is released at point $b_2$. Thereafter, the brake pressure is raised to point $b_3$. The specified time L2 is preferably set to about 0.2 to 0.5 second like the specified time L1, since a shock occurring at the instant the vehicle is released from a pivot turn condition is at its minimum value, with this range.

Steps T23 to T24: After releasing the lock-up mechanism from the inhibited condition, the transmission is shifted to an original position (speed range) to complete the flow.

According to the present embodiment, the pivot turn control is executed when the lever stroke of the traveling lever 15 is in the pivot turn region and the time during which the traveling lever 15 is kept within the pivot turn region becomes more than or equal to a specified time. However, an alternative may be made such that the traveling lever 15 is provided with a pivot turn control instruction switch at the desired portion and the pivot turn control is executed only when this pivot turn control instruction switch has been turned ON with the lever stroke being in the pivot turn region.

Whereas the present embodiment has been presented in terms of a bulldozer, it is apparent that the invention is applicable to other types of tracklaying vehicles.

What is claimed is:

1. A steering system for a tracklaying vehicle wherein a pair of brakes are provided for right and left output shafts and the driving force of a hydraulic motor is transmitted to the right and left output shafts through differential steering means, the system comprising:

(a) brake actuating means for independently actuating the right and left brakes;
(b) driving force transmission interrupting means for interrupting a transmission of a driving force from the hydraulic motor to the differential steering means;
(c) pivot turn control instruction signal detecting means for detecting an issue of a vehicle pivot turn control instruction signal;
(d) vehicle speed detecting means for detecting the vehicle body speed of the vehicle;
(e) controlling means for controlling the brake actuating means and the driving force transmission interrupting means in response to an output from the pivot turn control instruction signal detecting means such that after actuation of a brake for either one of the right and left output shafts by the brake actuating means and a transmission of a driving force from the hydraulic motor to the differential steering means are carried out concurrently for a specified period of time, the driving force transmission interrupting means interrupts the transmission of the driving force from the hydraulic motor to the differential steering means, wherein the controlling means controls an engine such that the vehicle body speed of the vehicle detected by the vehicle speed detecting means during a pivot turn of the vehicle becomes equal to a specified value.

2. The steering system for a tracklaying vehicle according to claim 1, wherein the vehicle body speed is detected by detecting the rotational speed of the output side of a transmission, and according to the detected vehicle body speed, the controlling means controls an engine rotation instruction value.

3. The steering system for a tracklaying vehicle according to claim 2, wherein the controlling means executes the engine control based on a map showing the relationship between vehicle body speed and engine rotation instruction values.

4. The steering system for a tracklaying vehicle according to claim 3, wherein the map is comprised of a first map for determining an engine rotation instruction value corresponding to a detected vehicle body speed and a second map for compensating for the deviation of the engine rotation instruction value determined by the first map from a target vehicle body speed.

5. A steering system for a tracklaying vehicle according to claim 1, further comprising tractive force detecting means for detecting the tractive force of the vehicle, wherein when the tractive force detected by the tractive force detecting means becomes more than or equal to a specified value during a pivot turn of the vehicle, the controlling means shifts a transmission to a lower speed range.

6. The steering system for a tracklaying vehicle according to claim 5, wherein when shifting the transmission to a lower speed range, gear shift is carried out with one selected from a plurality of speed range characteristic lines each representing a tractive force characteristic versus vehicle body speed, the selected speed range characteristic line providing a greater tractive force value for the same vehicle body speed than others.

* * * * *